(12) United States Patent
Hunt et al.

(10) Patent No.: US 6,385,963 B1
(45) Date of Patent: May 14, 2002

(54) OPTICAL SYSTEM FOR GENERATING ENDOTHERMIC FUEL FOR USE IN A PROPULSION PRODUCING ENGINE

(75) Inventors: Jeffrey H. Hunt, Chatsworth, CA (US); Herbert R. Lander, Heber City, UT (US)

(73) Assignee: The Boeing Company, Seal Beach, CA (US)

( * ) Notice: Subject to any disclaimer, the term of this patent is extended or adjusted under 35 U.S.C. 154(b) by 41 days.

(21) Appl. No.: 09/595,872

(22) Filed: Jun. 16, 2000

(51) Int. Cl.[7] ................................................. F02K 9/68
(52) U.S. Cl. ...................................... 60/203.1; 60/39.12
(58) Field of Search ............................ 60/39.12, 203.1, 60/218, 39, 462

(56) References Cited

U.S. PATENT DOCUMENTS 4,702,808 A    10/1987  Lemelson ............... 204/157.41
5,727,368 A    3/1998   Wernimont et al. ........... 60/218

FOREIGN PATENT DOCUMENTS

EP           0661424       *  7/1995

* cited by examiner

*Primary Examiner*—Louis J. Casaregola
(74) *Attorney, Agent, or Firm*—Lawrence N. Ginsberg

(57) ABSTRACT

The optical system includes an optical source capable of producing light having physical characteristics sufficient for optically driven chemical disassociation of a fuel; and, an optical delivery system for providing optical delivery of light from the optical source to a chemical fuel source. The optical system is used for a propulsion producing engine having a chemical fuel source. The endothermic fuel generation is produced by the non-linear, optical interaction of the produced light with the fuel, thereby leading to molecular dissociation of the fuel.

12 Claims, 3 Drawing Sheets

OPTICAL SYSTEM FOR GENERATING ENDOTHERMIC FUEL FOR USE IN A PROPULSION PRODUCING ENGINE

BACKGROUND OF THE INVENTION

1. Field of the Invention

The present invention relates to endothermic fuel generation systems and more particularly an endothermic fuel generation system for a propulsion producing engine that uses optical means for performing the chemical dissociation associated with so-called endothermic fuels.

2. Description of the Related Art

Purely thermodynamic means for the generation of endothermic fuels have long been used. Most fuels will dissociate into chemical radical constituents above a certain temperature. For example, if methanol is heated above 500° F., it breaks down into a methyl group and a hydroxyl radical. When the fuels are broken into smaller chemical constituents, they are capable of drawing heat from a body. This is extremely useful, for example, in high speed flight where wing surfaces must be cooled to prevent them from melting.

However, raising the temperature of a fuel to break it down is impractical since most fuels are kept cold to enhance their heat removal properties. An alternate means to dissociate the fuel molecule is to pass it through a catalyst. When a methanol molecule, by way of example, resides on a silver metal surface, the molecule will break down into the same radicals that result from heating. So, passing methanol through a silver catalytic bed will produce endothermic fuel at a low temperature.

However, catalytic beds have their own deficiencies. They are, by nature, heavy, bulky, difficult to flow through and subject to their own chemical and mechanical breakdowns.

U.S. Pat. No. 4,702,808, issued to J. H. Lemelson, entitled "Chemical Reaction Apparatus and Method" discloses rocket engine ignition in which propellants are ignited by an intense radiant energy, such as a light beam generated by a laser mounted in a housing. A beam of intense light is directed to the interior volume and caused to intersect fuel fed through inlets to effect ignition. There is no discussion in this patent of the photo-chemical interaction between the light and the fuel.

U.S. Pat. No. 5,727,368, issued to E. J. Wernimont, entitled "Hybrid Motor System with a Consumable Catalytic Bed a Composition of the Catalytic Bed and a Method of Using", discloses a method, device, and composition for achieving ignition and sustained combustion using a solid consumable catalytic bed. The consumable catalytic bed (CCB) accomplishes this by decomposition of an injected fuel. Initially, this reaction is catalytic or hypergolic)in nature eventually becoming entirely thermal as the CCB is consumed in the reaction generated. The patent is directed to a hydrogen peroxide hybrid rocket. The catalytic bed is divided for the purpose of generating ignition and does not create an endothermic fuel before introduction into the fuel chamber.

Present applicants are the inventors of U.S. Pat. Ser. No. 09/471,540 filed on Dec. 23, 1999, entitled: "Ignition System For A Propulsion Producing Engine". In that patent application, the inventors discussed an optical means for initiating combustion in a propulsion producing engine which uses peroxide as an oxidizer in the combustion reaction.

OBJECTS AND SUMMARY OF THE INVENTION

It is therefore a principal object of the present invention to provide an optical means to generate endothermic fuel for use in a propulsion producing engine.

Another object is to use an optical system as a means for disassociating the fuel.

These and other objects are achieved by the present invention, which in its broadest aspects, includes an optical source capable of producing light having physical characteristics sufficient for optically driven chemical disassociation of a fuel; and, an optical delivery system for providing optical delivery of light from the optical source to a chemical fuel source. The optical system is used for a propulsion producing engine having a chemical fuel source. The endothermic fuel generation is produced by the nonlinear, optical interaction of the produced light with the fuel, thereby leading to molecular dissociation of the fuel.

The use of optically induced endothermic fuel generation in a propulsion producing engine has advantages over standard endothermic fuel generation systems. Heating the fuel to break it into molecular constituents is impractical since fuel usually has the additional task of cooling the engine and/or airframe. If the fuel is hot, this capability is reduced. The standard endothermic fuel production means for most engines is a solid silver catalyst. The metal catalyst which holds the silver metal surface is large, heavy and must be located within the high speed flow between the fuel source and combustion chamber. Consequently, remote location is not possible. In addition to increased weight and volume, introduction of a catalyst in the fuel flow line causes pressure reduction, turbulence and reduced flow speeds. Optical fuel dissociation can be affected at any temperature, and the introduction of the light does not impinge on the fuel flow properties. The optical system can be located remotely and does not add the weight of a metal catalyst. Thus, the optical fuel dissociation leads to lighter weight engines.

These and other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
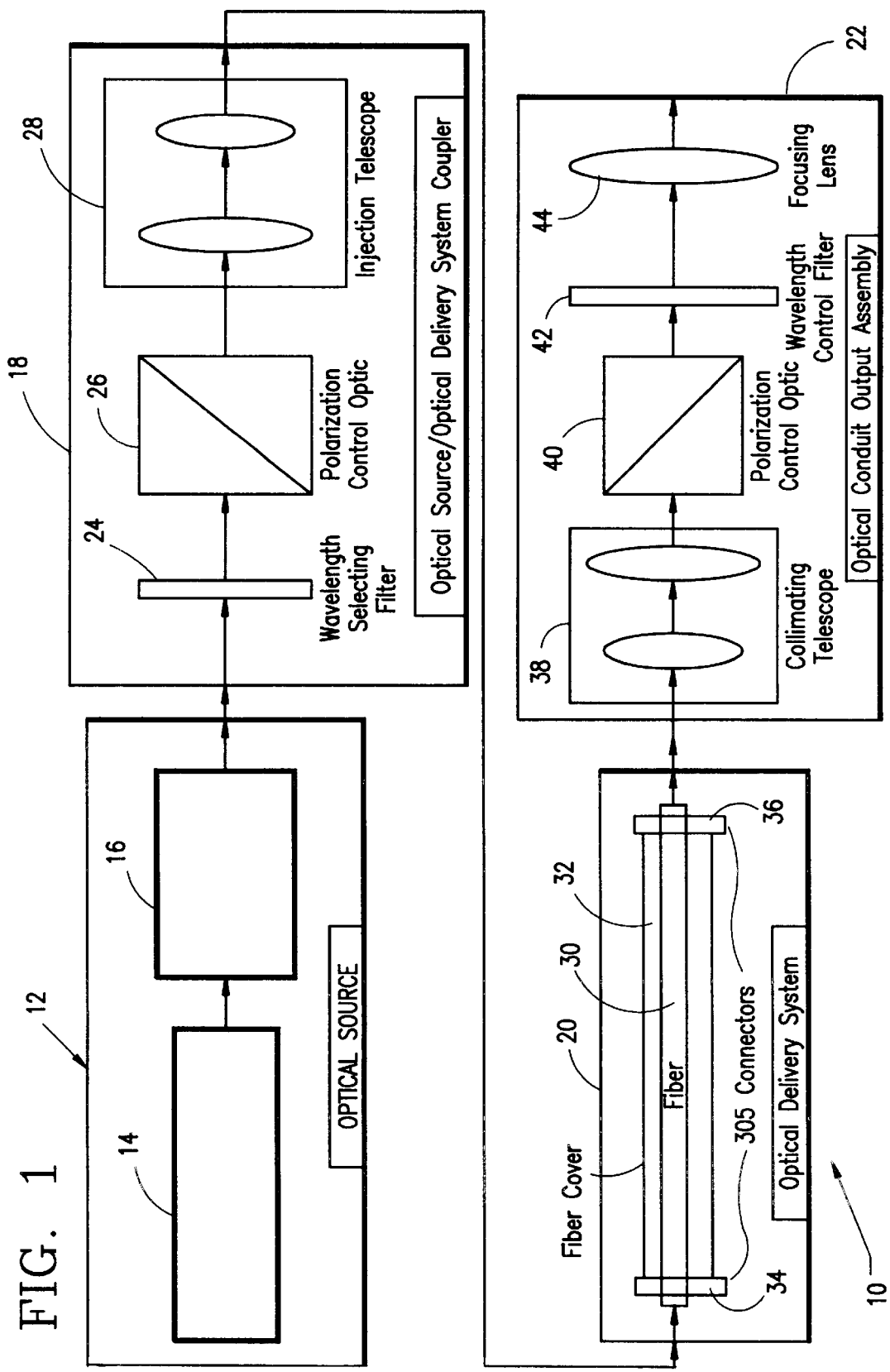
FIG. 1 is a schematic illustration of the optical system for the generation of endothermic fuel of the present invention.

Referring now to the drawings and the characters of reference marked thereon, FIG. 1 illustrates the optical system of the present invention, designated generally as 10. The optical system 10 includes a remotely located optical source, designated generally as 12. The optical source 12 includes a laser 14 for generating output light having an intensity of sufficient quantity to initiate chemical disassociation of a fuel. The laser 14 is preferably a diode pumped solid-state system. It preferably includes a Nd:YAG lasing medium with an internal Q-switch for the generation of high peak intensity pulses with an output wavelength of 1.064 microns. However, other solid-state lasing media may be employable in place of Nd:YAG.

The use of endothermic fuel is very desirable because it is capable of providing additional cooling to the engine or airframe.

A wavelength conversion device 16 is operably associated with the laser 14 for changing the laser output light from an original output wavelength to a shorter wavelength which is optimized for the disassociation of the fuel.

The wavelength conversion device 16 includes a non-linear optical crystal capable of providing phased matched generation of second harmonic, third harmonic and fourth harmonic of the input wavelength at 1.064 microns, assuming a Nd:YAG lasing medium is used.

An optical delivery system, designated generally by numeral designations 18, 20 and 22 provide optical delivery of light from the optical source 12 to a combustion chamber. The optical delivery system includes an optical source/optical delivery system coupler 18 connected, at a first end, to the optical source 12. An optical conduit 20 has a first end connected to a second end of the optical source/optical delivery system coupler 18. An optical conduit output assembly 22 is connected to a second end of the optical conduit 20 to capture the delivered light as it exits the optical conduit 20 and conditions the light in preparation for introduction into the combustion chamber.

The optical source/optical delivery system coupler 18 includes an input wavelength selecting filter 24 for receiving light from the optical source 12. The input wavelength selecting filter 24 is an optical element which allows, by an optical process, the transmission of the desired wavelength and does not transmit light of unwanted wavelengths. Such filters 24 are commercially available. An input polarization control optic 26 receives light exiting the input wavelength selecting filter 24. The polarization control optic 26 transmits lights of desired polarization and does not transmit light in undesirable polarizations.

An injection telescope 28 receives light exiting the input polarization control optic 26 and delivers the light to the optical conduit 20. The optical elements in the telescope 28 condition the laser light for entry into the optical fiber. This conditioning includes absolute beam spot size, as well as degree of collimation and angle of convergence into the fiber. Although the telescope is shown with two optical elements it may be necessary to use three elements in order to get needed optical injection characteristics in order to avoid loss of optical energy. The telescope 28 optical elements include AR (antireflection) coatings on all interior and exterior surfaces.

The optical conduit 20 includes an optical fiber 30 having a first end and a second end. A fiber cover 32 surrounds the optical fiber 30. A first optical fiber connector 34 is secured to the first end of the optical fiber 30. A second optical fiber connector 36 is secured to the second end of the optical fiber 30. Thus, the first optical fiber connector 34 is attached to the optical source/optical delivery coupler 18 while the second optical fiber connector 36 attaches to the optical conduit output assembly 22.

The optical fiber 30 must be capable of propagating the optical light at appropriate energy, intensity and wavelength. Thus, the optical fiber material has a high-damage threshold so that the light does not damage it. The optical fiber 30 material is optically hard and of sufficiently large diameter to propagate the light without damage. Such an optical fiber 30 is commercially available. An example of such a fiber is that manufactured by 3M Specialty Optical Fibers. It is specified as a coated silica/silica fiber under the FG series.

The optical conduit assembly 22 includes a collimating telescope 38 for receiving light as it exits the second end of the optical conduit 20. The collimating telescope 38 has optical characteristics which provide the capability of capturing the light as it exits the optical fiber 30. It collimates the light for transmission through the subsequent elements of the optical conduit output assembly 22. As with the injection telescope 28 there may be more than two elements. These elements are preferably anti-reflection coated.

An output polarization control optic for 40 receives light exiting the collimating optical telescope 38. Its characteristics are the same as discussed above with respect to polarization control optic 26. An output wavelength selecting filter 42 receives light exiting the output polarization control optic 40. Its characteristics are the same as the input wavelength selecting filter 24. A focusing lens 44 receives light from the output wavelength selecting filter 42 and introduces the light into a chemical fuel source.

The focusing lens 44 has optical properties so that, at its focus point, the intensity of the light is sufficiently high to provide the non-linear optical interaction leading to the fuel disassociation.

Figure 2:
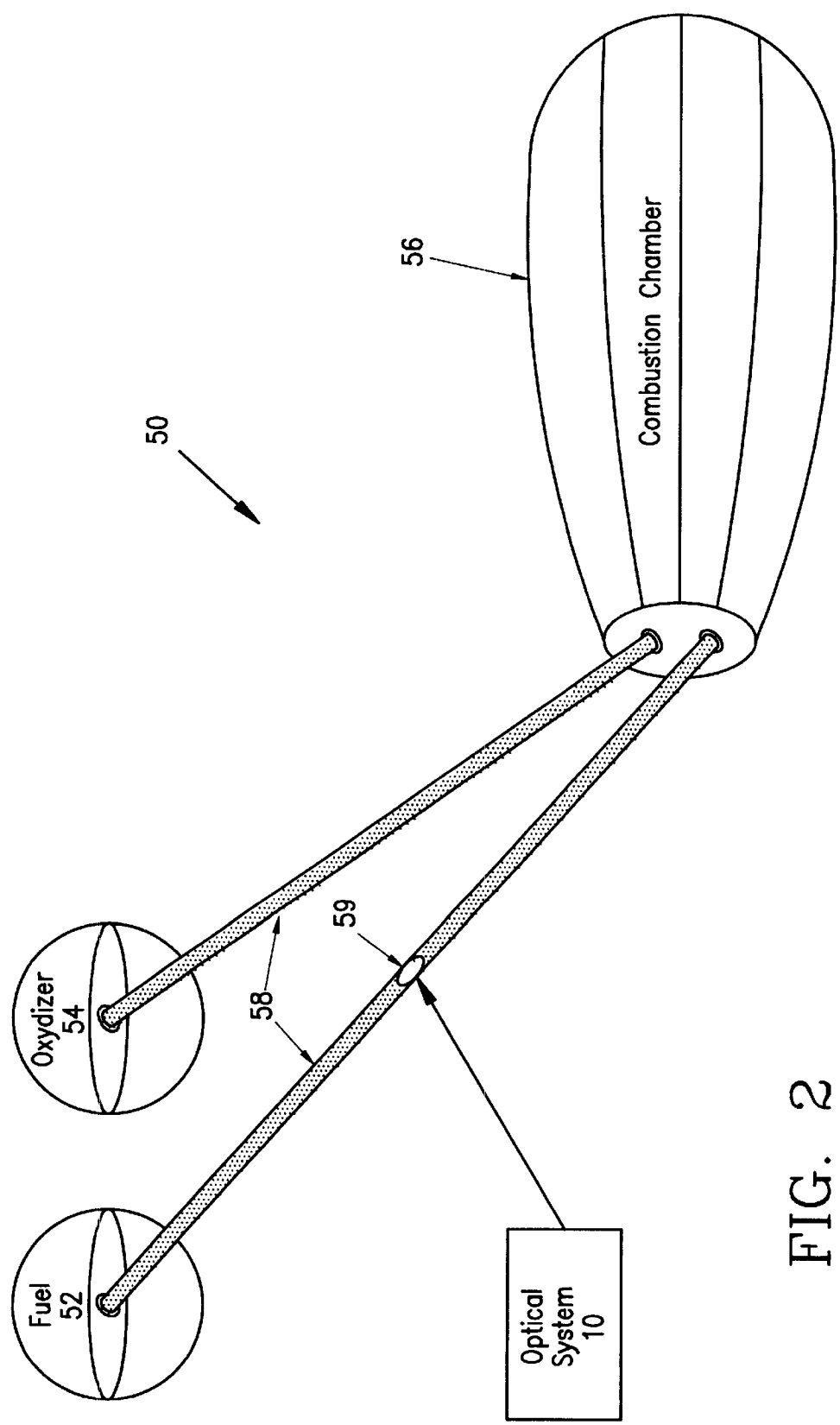
FIG. 2 is a schematic illustration of a chemical fuel source for a propulsion producing engine of the present invention.

Referring now to FIG. 2, a propulsion producing engine utilizing the optical system 10 is illustrated, the engine being designated generally as 50. The engine 50 includes a fuel source 52 for supplying fuel capable of reacting with the oxidizer. An oxidizer source 54 supplies the oxidizer. Additionally, means 58 are provided for introducing the fuel and oxidizer into the combustion chamber 56. Means 58 includes a window 59 is to allow the optical system 10 to introduce its optical energy into the fuel, generating the endothermic fuel. There are constraints on the material to be used in the window. The window material must be transmissive to ultraviolet light. It must have mechanical properties, such that it can withstand the acoustic shocks. It must be able to handle heating associated with operation in an engine environment. The preferred material will be sapphire. Sapphire has good ultraviolet transmission properties. It may have an anti-reflection coating for ideal UV operation. Sapphire is very hard mechanically and able to handle the thermal changes associated with use in an engine environment. Additionally, the window may need to be kept clean during firing to allow for successive light transmissions. In that circumstance, a gas "curtain" will be flowed. across the interior surface of the window to minimize the amount of contaminant that may deposit there.

Figure 3:
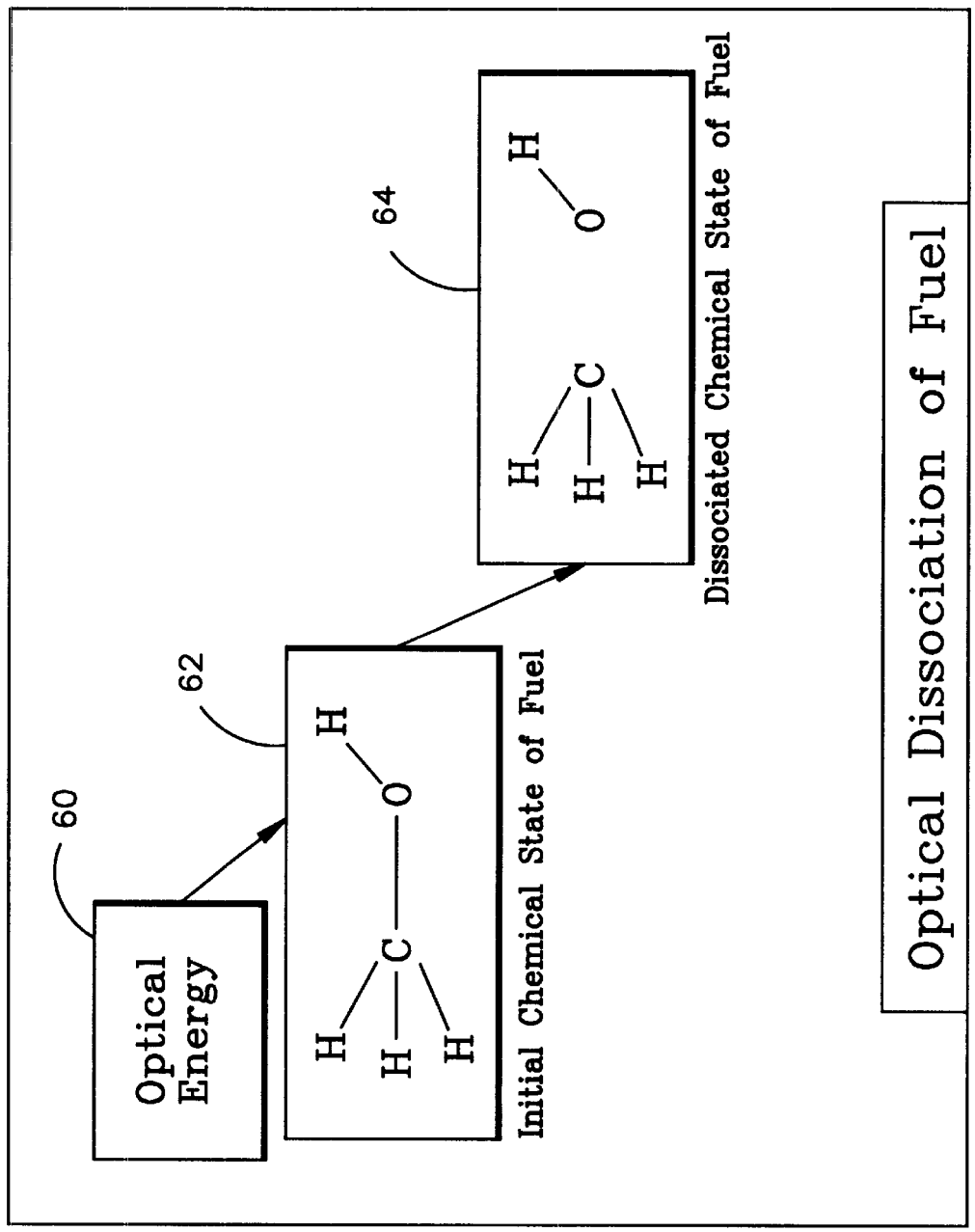
FIG. 3 is a chemical schematic illustration showing the interaction of light with the fuel leading to an optically disassociated state thereof.

Referring now to FIG. 3, the interaction light 60 with the fuel is shown leading to an optically disassociated state of the fuel. As an example, we show methanol, with the understanding that the fuel need not be limited to methanol. It is shown in its initial chemical configuration in the box designated 62 and in the disassociated chemical configuration in the box designated 64. The absorption of the optical energy breaks the molecule into constituent radicals, creating the endothermic fuel.

The process for this is fairly complex. The light has been shifted to a short wavelength in the ultraviolet regime of the spectrum. However, it is still not short enough for direct absorption by a fuel . The absorption occurs via a nonlinear optical absorption. In this situation, the light intensity has been made sufficiently high (by a combination of using short pulses and focusing the light to a small spot in the ignition regime) that the oxidizer can absorb light at a harmonic of its wavelength. Specifically, light at wavelength $\lambda$ in the chamber will be absorbed as if its wavelength is $\tfrac{1}{2}\lambda$. This can always occur in a medium if the light intensity is high enough.

The equation governing the optical intensity to drive the optical breakdown is given by:

$$I_{cr} = \{[mcE_1(1+(\omega\tau)^2)]/[2\pi e^2\tau]\}[g+1/\tau_p \log_e(\rho_{cr}/\rho_o)],$$

Where $\rho_{cr}$ is the critical electron number for breakdown; $\tau_p$ is the laser pulsewidth; m,e,c are the electron constants; $\omega$ is the optical field frequency; $E_1$ is the ionization energy of the fuel or oxidizer; $\tau$ is the momentum transfer collision time; g is the electron loss rate; and $\rho_o$ is the "initial" electron density. Optical systems can be designed which can deliver this level of intensity into the fuel.

As noted above, the dissociated fuel is endothermic. As such, it is capable of providing additional heat removal from high temperature surfaces in an air-frame.

Obviously, many modifications and variations of the present invention are possible in light of the above teachings. It is, therefore, to be understood that, within the scope of the appended claims, the invention may be practiced otherwise than as specifically described.

What is claimed and desired to be secured by Letters Patent of the United States is:

1. An optical system for generating endothermic fuel for a propulsion producing engine having a chemical fuel source comprising:
   a) an optical source capable of producing light having physical characteristics sufficient for non-linear optically driven chemical dissociation of a fuel; and
   b) an optical delivery system for providing optical delivery of light from said optical source to a chemical fuel source, wherein the endothermic fuel generation is produced by the non-linear, optical interaction of said produced light with the fuel, thereby leading to molecular dissociation of the fuel.

2. The optical system of claim 1, wherein said optical delivery system, comprises:
   a) an optical source/optical delivery system coupler connected, at a first end, to said optical source;
   b) an optical conduit having a first end connected to a second end of said optical source/optical delivery system coupler; and
   c) an optical conduit output assembly connected to a second end of said optical conduit to capture the delivered light as it exits the optical conduit and conditions it in preparation for introduction into the chemical fuel source.

3. The optical system of claim 2, wherein said optical source/optical delivery system coupler, comprises:
   a) an input wavelength selecting filter for receiving light from the optical source;
   b) an input polarization control optic for receiving light exiting said input wavelength selecting filter; and
   c) an injection telescope for receiving light exiting said input polarization control optic and delivering the light to said optical conduit.

4. The optical system of claim 2, wherein said optical conduit output assembly, comprises:
   a) a collimating telescope for receiving light as it exits the second end of said optical conduit;
   b) an output polarization control optic for receiving light exiting said collimating telescope;
   c) an output wavelength selecting filter for receiving light exiting said output polarization control optic; and
   d) a focusing lens for receiving light from said output wavelength selecting filter and introducing light into the chemical fuel source.

5. The optical system of claim 1, wherein said optical source, comprises:
   a) a laser for generating output light having an intensity of sufficient quantity to initiate said fuel chemical dissociation; and
   b) a wavelength conversion device operably associated with said laser for changing the laser output light from an original output wavelength to a shorter wavelength which is optimized for the dissociation of the fuel.

6. The optical system of claim 2, wherein said optical conduit, comprises:
   a) an optical fiber having a first end and a second end;
   b) a fiber cover surrounding said optical fiber;
   c) a first optical fiber connector secured to the first end of said optical fiber; and
   d) a second optical fiber connector secured to the second end of said optical fiber,
      wherein said first optical fiber connector is attached to said optical source/optical delivery system coupler and said second optical fiber connector is attached to said optical conduit output assembly.

7. A propulsion producing engine, comprising:
   a) a chemical fuel source for supplying fuel capable of reacting exothermically with an oxidizer;
   b) an oxidizer source for supplying oxidizer;
   c) a combustion chamber;
   d) means for introducing said fuel and said oxidizer into said combustion chamber; and
   e) an optical system, comprising:
      i) an optical source capable of producing light having physical characteristics sufficient for non-linear optically driven chemical disassociation of said fuel; and
      ii) an optical delivery system for providing optical delivery of light from said optical source to said chemical fuel source, wherein
         the endothermic fuel generation is produced by the non-linear, optical interaction of said produced light with the fuel, thereby leading to molecular disassociation of the fuel.

8. The optical system of claim 7, wherein said optical delivery system, comprises:
   a) an optical source/optical delivery system coupler connected, at a first end, to said optical source;
   b) an optical conduit having a first end connected to a second end of said optical source/optical delivery system coupler; and
   c) an optical conduit output assembly connected to a second end of said optical conduit to capture the delivered light as it exits the optical conduit and conditions it in preparation for introduction into the chemical fuel source.

9. The optical system of claim 8, wherein said optical source/optical delivery system coupler, comprises:
   a) an input wavelength selecting filter for receiving light from the optical source;
   b) an input polarization control optic for receiving light exiting said input wavelength selecting filter; and
   c) an injection telescope for receiving light exiting said input polarization control optic and delivering the light to said optical conduit.

10. The optical system of claim 8, wherein said optical conduit output assembly, comprises:
    a) a collimating telescope for receiving light as it exits the second end of said optical conduit;
    b) an output polarization control optic for receiving light exiting said collimating telescope;
    c) an output wavelength selecting filter for receiving light exiting said output polarization control optic; and
    d) a focusing lens for receiving light from said output wavelength selecting filter and introducing light into the chemical fuel source.

11. The optical system of claim 7, wherein said optical source, comprises:
   a) a laser for generating output light having an intensity of sufficient quantity to initiate said fuel chemical dissociation; and
   b) a wavelength conversion device operably associated with said laser for changing the laser output light from an original output wavelength to a shorter wavelength which is optimized for the dissociation of the fuel.

12. The optical system of claim 8, wherein said optical conduit, comprises:
   a) an optical fiber having a first end and a second end;
   b) a fiber cover surrounding said optical fiber;
   c) a first optical fiber connector secured to the first end of said optical fiber; and
   d) a second optical fiber connector secured to the second end of said optical fiber, wherein said first optical fiber connector is attached to said optical source/optical delivery system coupler and said second optical fiber connector is attached to said optical conduit output assembly.

* * * * *